US009946716B2

(12) United States Patent
Makkar et al.

(10) Patent No.: US 9,946,716 B2
(45) Date of Patent: *Apr. 17, 2018

(54) DISTRIBUTED FILE SYSTEM SNAPSHOT (71) Applicant: NETAPP, INC., Sunnyvale, CA (US)

(72) Inventors: Gaurav Makkar, Bangalore (IN);
Srinivasan Narayanamurthy,
Bangalore (IN); Kartheek Muthyala,
Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,034

(22) Filed: Apr. 12, 2016

(65) Prior Publication Data

US 2016/0246803 A1    Aug. 25, 2016

Related U.S. Application Data (63) Continuation of application No. 14/195,752, filed on Mar. 3, 2014, now Pat. No. 9,336,219.

(51) Int. Cl.
*G06F 7/02* (2006.01)
*G06F 17/30* (2006.01)

(52) U.S. Cl.
CPC ...... *G06F 17/30088* (2013.01); *G06F 17/302* (2013.01); *G06F 17/30203* (2013.01); *G06F 17/30212* (2013.01); *G06F 17/30312* (2013.01); *G06F 17/30327* (2013.01)

(58) Field of Classification Search
CPC .......... G06F 11/1435; G06F 17/30312; G06F 17/30327; G06F 11/1446; G06F 17/30318; G06F 17/30088; G06F 17/30203

See application file for complete search history.

(56) References Cited

U.S. PATENT DOCUMENTS

| 8,818,951 | B1 | 8/2014 | Muntz et al. | |
| 9,069,710 | B1 | 6/2015 | Modukuri et al. | |
| 2002/0188758 | A1* | 12/2002 | Nakajima | H04L 29/12132 709/245 |
| 2011/0137863 | A1 | 6/2011 | Anzai et al. | |
| 2014/0006465 | A1* | 1/2014 | Davis | G06F 17/30194 707/827 |
| 2015/0067002 | A1* | 3/2015 | Shvachko | G06F 17/30174 707/827 |

* cited by examiner

*Primary Examiner* — Bruce M Moser
(74) *Attorney, Agent, or Firm* — Nixon Peabody LLP; Jeffrey L. Costellia (57) ABSTRACT Technology is disclosed for managing data in a distributed file system ("the technology"). The technology can gather metadata information associated with the data stored within the distributed file system, create a secondary namespace within a local file system of a local host using the gathered metadata information and store the gathered metadata information as files within the secondary namespace. Further, when a request to create a PPI of the distributed file system is received, the technology can create a PPI of the secondary namespace using a PPI creation feature of the local file system.

20 Claims, 8 Drawing Sheets

DISTRIBUTED FILE SYSTEM SNAPSHOT

CROSS-REFERENCE TO RELATED APPLICATION

This application is a continuation under the provisions of 35 U.S.C. § 120 of U.S. patent application Ser. No. 14/195,752 entitled, "DISTRIBUTED FILE SYSTEM SNAPSHOT", filed on Mar. 3, 2014. The disclosure of U.S. patent application Ser. No. 14/195,752 is hereby incorporated herein in its entirety for all purposes.

TECHNICAL FIELD

Various of the disclosed embodiments relate to data management in distributed file systems.

BACKGROUND

Distributed data processing systems may be used to process and analyze large datasets. One such framework used to efficiently process and analyze large datasets is Hadoop, which provides data storage services to clients using a Hadoop Distributed File System (HDFS) and data processing services though a cluster of commodity computers or nodes. The HDFS executes on the cluster of computers (also called as compute nodes or processing nodes) to enable client access to the data in the form of logical constructs organized as blocks, e.g., HDFS blocks. The compute nodes operate mostly independently, to achieve or provide results toward a common goal.

Such a data management framework enables a distributed data processing system ("system"), e.g., Hadoop, to support critical large scale data-intensive applications. These data-intensive applications, however, require frequent automated system backups with zero or minimal application downtime. As a result, the ability to create a read-only, persistent, point-in-time image (PPI) (also referred to as a "snapshot") of the files and directories and their associated metadata as they were in a particular point in the past in the system, e.g., Hadoop, becomes important. This capability allows the exact state of the files and directories to be restored from the PPI in the event of a catastrophic failure of the system.

However, many distributed data processing systems, e.g., Hadoop, do not have a robust PPI creation ability as such systems logically maintain the file system metadata and the stored data separately. In Hadoop, a master node (known as the NameNode) maintains HDFS and tracks the file metadata. Further, each stored file in Hadoop is divided into data blocks and replicated across various compute nodes (also known as the DataNodes). When creating a PPI in such a framework, the system needs to not only compare and determine the changes to the HDFS within a given timeframe but also track the state of multiple data blocks and their replicas that are associated with the changes in HDFS. Such a process creates a huge latency.

Figure 1:
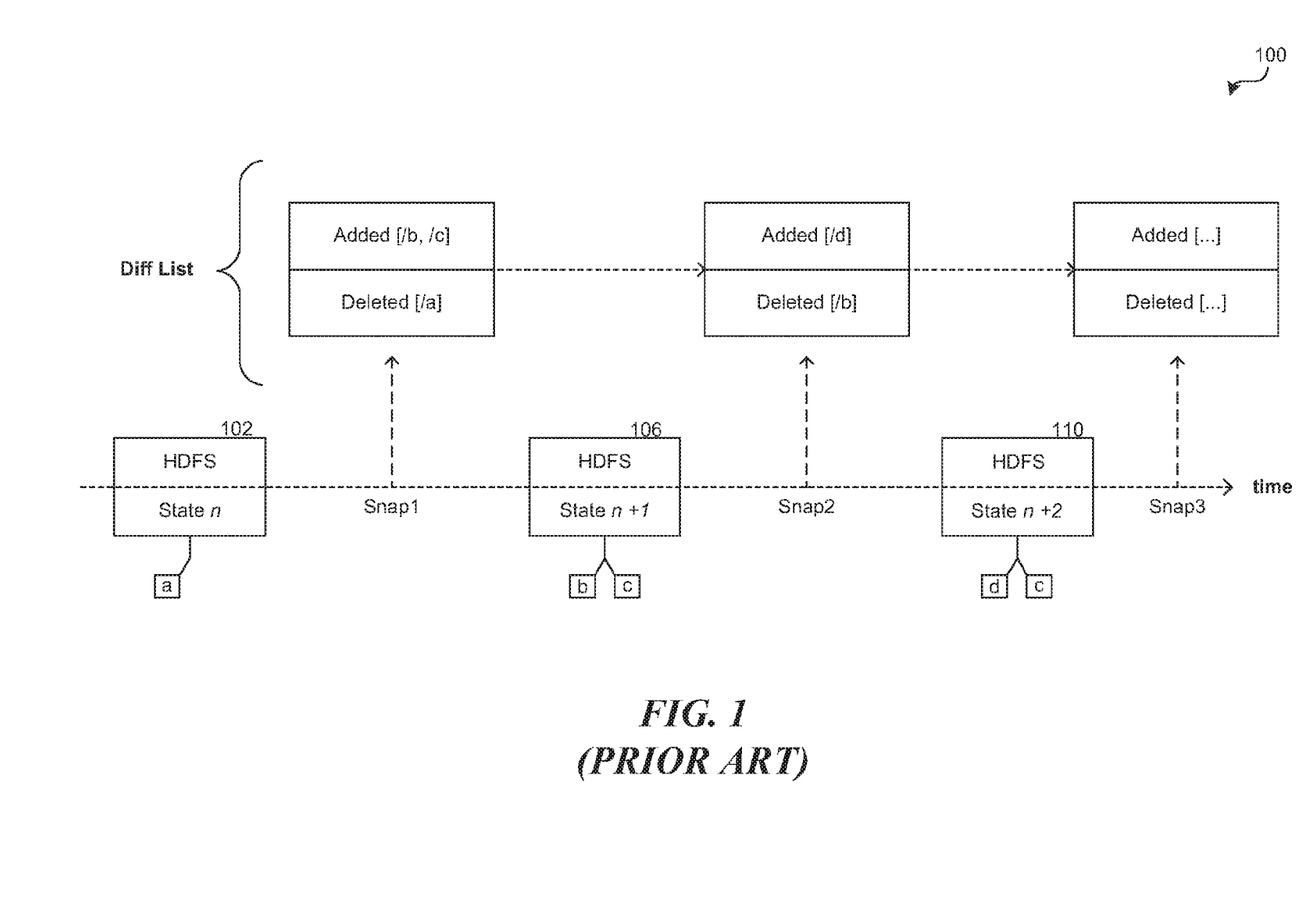
FIG. 1 provides a timeline 100 illustrating the creation of PPIs in a Hadoop system using a known technique.

FIG. 1 illustrates a timeline 100 illustrating the creation of PPIs in a Hadoop system using a known technique. The technique involves traversing through each directory in HDFS to examine each file in each directory to identify files that have been modified, added, or accessed within a given timeframe. The technique utilizes the identified changes and the prior PPI to create a new PPI of HDFS. In FIG. 1, the earliest PPI of HDFS is represented by state n 102, where the state n includes file "a".

When PPI "Snap1" is created, the technique is utilized to traverse the current HDFS and determine that files "b" and "c" have been added and file "a" has been deleted since the last PPI (i.e. state n 102) was created. The technique then creates a new PPI of HDFS, represented by state n+1 106, by applying the determined changes to the state n 102 PPI of HDFS. Further, the technique tracks and creates PPIs of the multiple data blocks and their replicas that are associated with the changed files "a", "b" and "c" in HDFS.

For instance, when the DataNode receives a request to create a local PPI of the stored data blocks, the DataNode creates a copy of the storage directory and hard links the existing block files into the directory. So, when the DataNode removes a block, the DataNode only removes the hard link. The old block replicas remain untouched in their old directories. The cluster administrator can choose to roll back HDFS to the PPI state when restarting the system. The DataNode restore the previously renamed directories and initiates a background process to delete block replicas created after the PPI was made. However, once having chosen to roll back, there is no provision to roll forward.

In FIG. 1, when a next PPI of HDFS is created, the technique utilizes the last PPI (i.e. state n+1 106) to determine the changes to HDFS between the last PPI and the time of the current PPI. The latest PPI of HDFS is maintained as state n+2 110, independent of states n and n+1. A user can utilize any of the PPIs 102, 106, 110 to roll back the HDFS and the associated data back to the state HDFS and the associated data existed at the time of the given PPI. Such a technique for PPI creation in Hadoop can thus be not only complex but also very slow.

Accordingly, the known PPI techniques for distributed processing systems are limited in their capabilities and suffers from at least the above constraints and deficiencies.

DETAILED DESCRIPTION

Technology is disclosed for managing data in a distributed processing environment ("the technology"). The technology reduces the complexity and time required to create a point-in-time image (PPI) in the distributed processing environment by gathering metadata information associated with the data stored in the distributed file system. The metadata information is stored within a namespace of the distributed file system ("primary namespace") that maintains the hierarchy of files and directories associated with the stored data.

Upon receiving the gathered metadata information, the technology facilities creation of a secondary namespace within a local file system of a local host with a hierarchy of files and directories which correspond to the hierarchy of files and directories in the primary namespace of the distributed file system. Further, the technology stores the gathered metadata information as files within the secondary namespace. When distributed file system receives a request to create a PPI of the primary namespace, the technology employs a PPI creation feature of the local file system to create a PPI of the secondary namespace.

Figure 2:
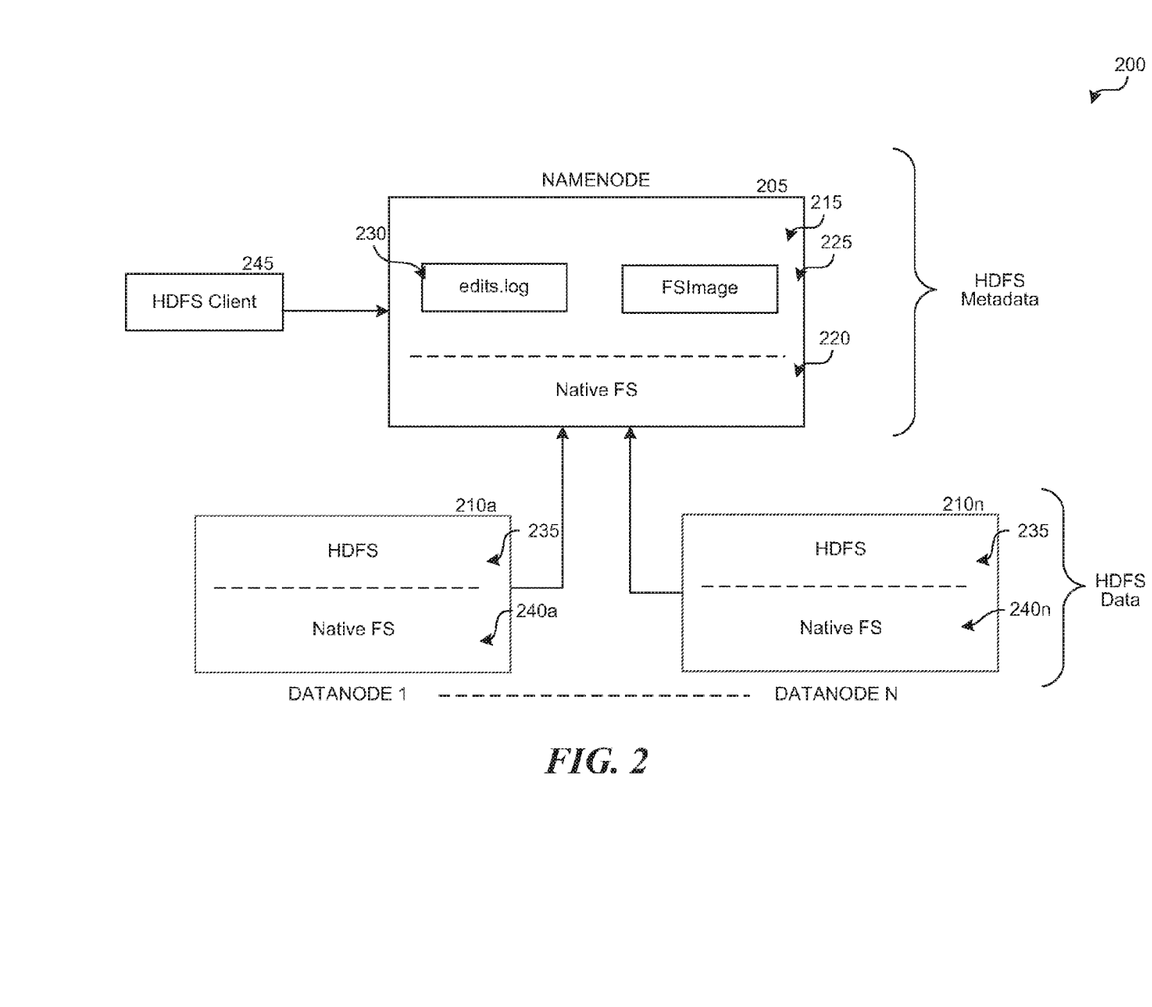
FIG. 2 is a block diagram illustrating a distributed processing environment in which the technology can operate in various embodiments.

Several embodiments of the disclosed technology are described in more detail in reference to the Figures. Turning now to Figures, FIG. 2 is a block diagram illustrating a Hadoop distributed processing environment 200 in which the technology can operate in various embodiments. It should be noted that the described technology can be implemented in other distributed processing environments and the technology's operation should not be considered limited to the Hadoop distributed processing environment 200.

The distributed processing environment 200 includes a Hadoop Distributed File System ("HDFS") (also referred to as the primary file system or simply file system), a NameNode server 205 ("NameNode") to manage the namespace 215 of HDFS, several DataNode servers 210a-210n ("DataNode") to store and facilitate access to HDFS managed data received from the HDFS client system 245, a Native File System ("NFS") 220, 240a-240n (also referred to as local file system or secondary file system), independent of HDFS, implemented in each of the local hosts acting as DataNodes 210a-210n and NameNode 205, and a network (not shown) connecting the various components of the distributed processing environment 200. Further, the NameNode server 205 and the DataNode servers 210a-210n each comprise an operating system that manages the resource allocation of a corresponding computing system (e.g., server), where the operating systems utilize one or more file systems, e.g., NFS 220, 240a-240n, and their associated features to facilitate storing and management of data in the servers 205, 210a-210n.

The NameNode 205 maintains the HDFS namespace 215. Any change to the HDFS namespace 215 or its properties is recorded by the NameNode 205. The HDFS namespace 215 is a hierarchy of files and directories. Files and directories are represented on the NameNode by inodes, which record attributes like permissions, modification and access times, namespace and disk space quotas.

As discussed earlier, the content of a file is split into large blocks (typically 128 megabytes, but user selectable file-by-file) and each block of the file is independently replicated at multiple DataNodes 210a-210n. The NameNode 205 maintains the namespace tree and the mapping of file blocks to DataNodes 210a-210n (i.e. the physical location of file data). An HDFS client wanting to read a file first contacts the NameNode for the locations of data blocks comprising the file and then reads block contents from the DataNode closest to the client.

Figure 3:
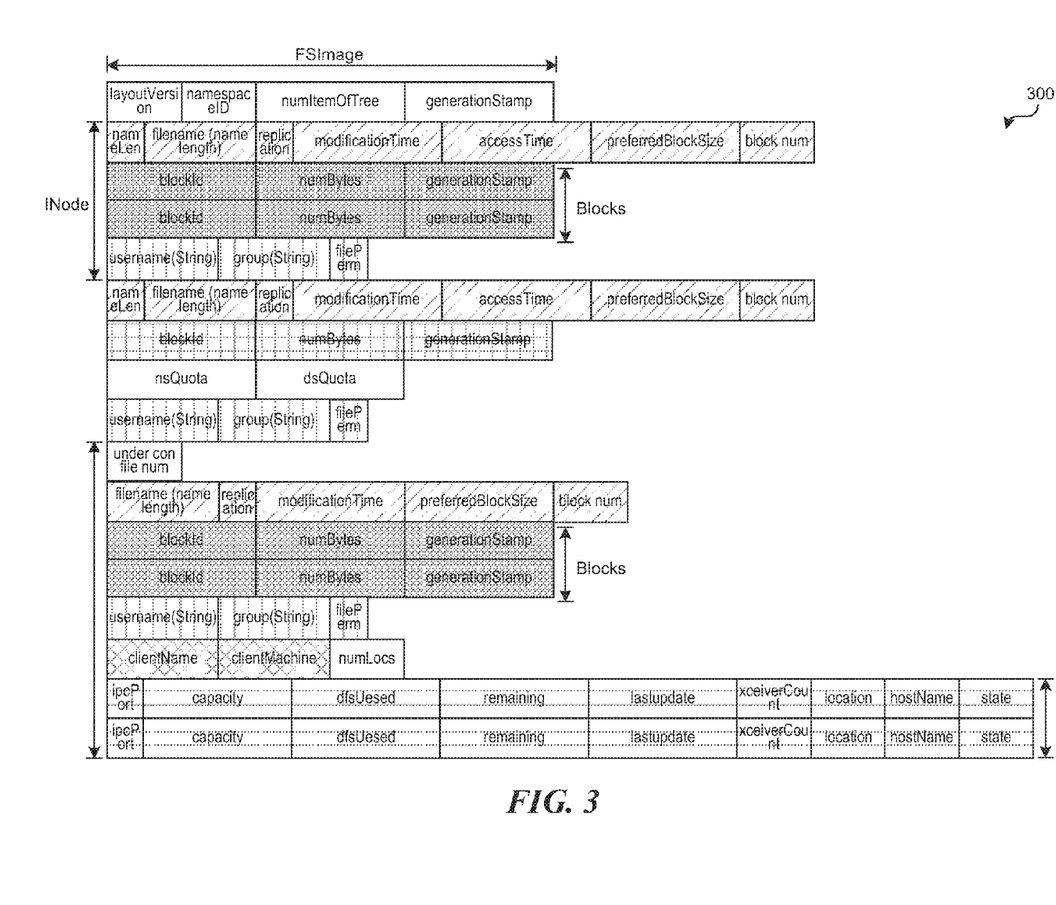
FIG. 3 is an illustration of a FSImage file and the various metadata captured within the FSImage file.

In HDFS, the FSImage file 225 represents a persistent checkpoint of the file system metadata. Turning briefly to FIG. 3, FIG. 3 is an illustration 300 of an FSImage file 225 and the various metadata captured within the FSImage file 225. The FSImage file 225 contains a serialized form of all the directory and file inodes in the file system. Each inode is an internal representation of a file or directory's metadata and contains such information as the file's replication level, modification and access times, access permissions, block size, and the blocks a file is made up of.

Further, for directories, the modification time, permissions, and quota metadata is stored. The FSImage file 225, however, does not record the DataNodes 210a-210n on which the blocks are stored. Instead the NameNode 205 keeps this mapping as a BlockMap file in memory, which it constructs by asking the DataNodes 210a-210n for their block lists when they join the cluster and periodically updates the BlockMap to ensure the NameNode's 205 block mapping is up-to-date.

Returning to FIG. 2, the persistent record of the FSImage file 225 is stored in the native files system 220 of the local host acting as the NameNode 205. The persistent record of the FSImage file 225 can be referred to as a "checkpoint." When a file system client 245 performs a write operation (e.g., by creating or moving a file), the NameNode 205 does not directly send the transaction request to the pertinent DataNodes 210a-210n. Instead, the operation is first recorded in a transaction log called the EditLog 230 (also referred to as the journal or the edits.log).

The NameNode 205 uses the EditLog 230 to persistently record every change that occurs to file system metadata. For example, creating a new file in HDFS causes the NameNode 205 to insert a record into the EditLog 230 indicating this creation. Similarly, changing the replication factor of a file causes a new record to be inserted into the EditLog 230. The NameNode then updates an in-memory representation of the file system metadata (i.e. the data associated with the namespace), after the EditLog 230 has been modified. The in-memory metadata is used to serve read requests. Further, the NameNode 205 also stores the EditLog 230 as a file in the local host's Native File System 220.

As discussed above, the FSImage file 225 is a persistent checkpoint of the file system metadata. The FSImage file 225, however, is not updated for every file system write operation as writing out the FSImage file 225, which can grow to be gigabytes in size, would be very slow. In the event of a failure of the NameNode 205, the latest metadata in the up-to-date FSImage file 225, stored in the RAM, will be lost. However, the FSImage file 225 can be reconstructed by loading the last persistent checkpoint of the FSImage file 225, stored in the local host's Native File System 220, and applying each of the operations in the EditLog 230.

Figure 4:
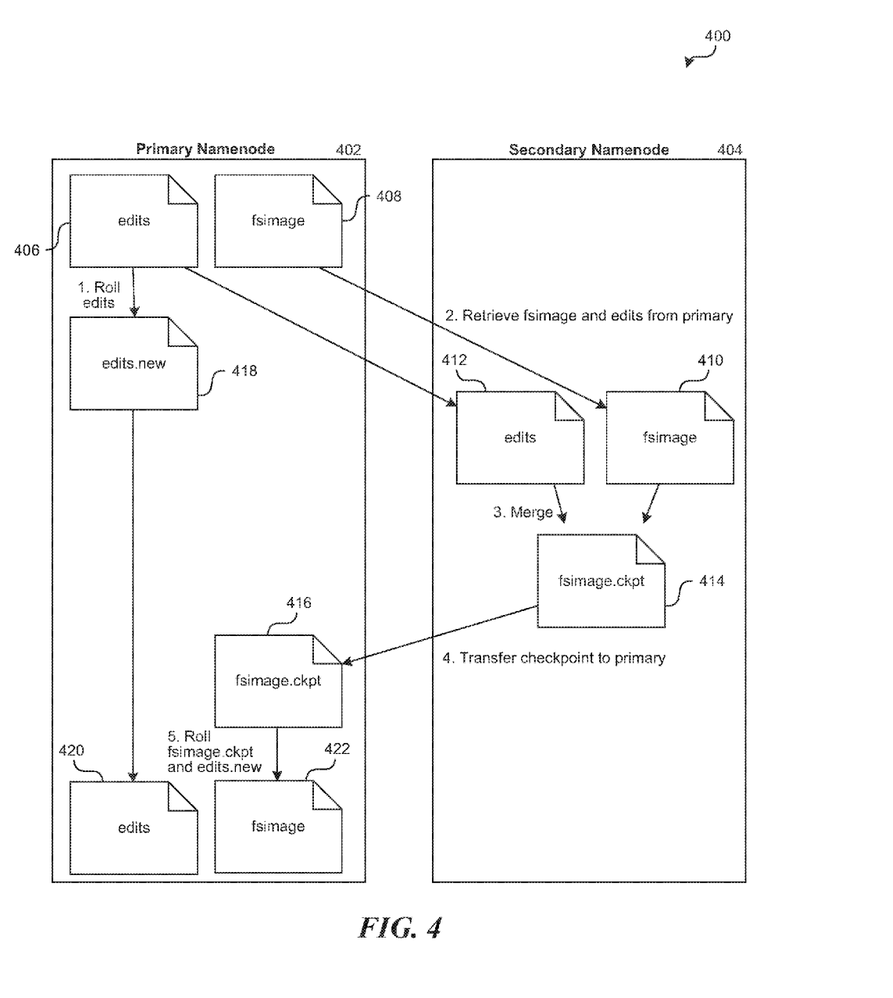
FIG. 4 is a block diagram illustrating a technique for periodically creating a FSImage file checkpoint by flushing the EditLog.

In some embodiments, the NameNode 205 performs a periodic persistent checkpoint creation of the FSImage file 225 to ensure that the edits in the EditLog 230 are flushed and synced with the FSImage file 225. Turning briefly to FIG. 4, FIG. 4 is a block diagram illustrating a technique for periodically creating a FSImage file checkpoint 414, 416 by flushing the EditLog 406. The technique involves utilizes a secondary NameNode 404 to produce checkpoints of the primary NameNode's 205, 402 in-memory file system metadata.

When a checkpoint creation is initiated, the secondary NameNode 404 requests the primary NameNode 402 to roll its EditLog 406 and create a new EditLog 418 for the new edits. The secondary NameNode 404 then retrieves the FSImage file 408 and the EditLog 406 from the primary NameNode 402. After retrieving the FSImage file 408, 410 and EditLog 406, 412, the secondary NameNode 404 loads the FSImage file 408, 410 into its memory and applies each of the logged operation from the EditLog 406, 412 to create a new consolidated FSImage file 414.

The secondary NameNode 404 then transfers the new FSImage file 414, 416 back to the primary NameNode 402. The primary NameNode 402 replaces the old FSImage file 408 with the new one 414, 416 from the secondary NameNode 404. The primary NameNode 402 further replaces the old EditLog 406 with the new one 418. The primary NameNode 402 also record the time the checkpoint was taken.

At the end of the process, the primary NameNode 402 has an up-to-date FSImage file 416 and a shorter EditLog 420 (though it might not necessarily empty, as it may have received some edits while the checkpoint was being taken). In the NameNode 404, the schedule for initiating a checkpoint is controlled by two configuration parameters. In some embodiments, the secondary NameNode 404 periodically checkpoints at a fixed time period. In some embodiments, the secondary NameNode 404 checkpoints sooner than the fixed time period when the edit log has reached a certain threshold size (e.g., 64 MB).

Returning to FIG. 2, the DataNodes 210a-210n store the HDFS data as files in their respective local host system's Native File System 240a-240n (also referred to as local file system). The DataNodes 210a-210n have no knowledge about HDFS files. For instance, the DataNode 210a stores each block of HDFS data in a separate file in its respective local file system. The DataNode 210a does not create all the files in the same directory.

In some embodiments, the DataNode 210a uses a heuristic to determine the optimal number of files per directory and creates subdirectories appropriately. It might not be optimal to create all local files in the same directory as the local file system might not be able to efficiently support a huge number of files in a single directory. When the DataNode 210a begins operation, it scans through its local file system, generates a list of all HDFS data blocks that correspond to each of these local files and sends this scanned information as a Blockreport to the NameNode 205.

As discussed above, the NameNode 205 utilizes the Blockreport to create a BlockMap that contains a mapping between the data blocks and the various DataNodes 210a-210n in which the respective data blocks are stored within. The NameNode 205 utilizes the BlockMap to identify the DataNodes 210a-210n which contain a particular data block and direct any access request for the particular data block to the identified DataNodes 210a-210n.

In some embodiments, the disclosed technology can be implemented in the NameNode 205 to enable creation of PPIs of the files and directories and the associated file system metadata as they were in a particular point in time in the system 200. The PPIs allow the system 200 to restore the exact state of the files and directories in the event of a catastrophic failure of the system 200.

In some embodiments, the disclosed technology utilizes the Native File System 220 ("NFS") of the local host acting as the NameNode 205 to create a new namespace (also referred to as the secondary namespace) within the NFS 220, where the new namespace is a copy of the HDFS namespace 215 (as maintained in the FSImage file 225) and its hierarchy of files and directories. The NFS 220 can be any file system supported by the Operating System ("OS") of the local host acting as the NameNode 205. The OS can include be any Linux based system while the NFS can include any Linux compatible systems, e.g., NTFS, ext2, ext3, Write Anywhere File Layout ("WAFL"), Btrfs, etc.

The disclosed technology can then utilize the PPI features associated with the NFS 220 to create a PPI of the secondary namespace, where the PPI of the secondary namespace serves as the PPI of the HDFS namespace. For instance, for a local host with a WAFL based file system, the local host, acting as the NameNode 205, can utilize the PPI feature of the WAFL based file system. An example of a PPI implementation that can utilized in a WAFL based file system is disclosed in commonly-assigned U.S. Pat. No. 7,562,077.

The PPI of the secondary namespace serves as the PPI of the HDFS namespace. In some embodiments, when the disclosed technology receives a request to revert the HDFS namespace and the data stored within to an earlier state, the disclosed technology identifies a particular PPI of the secondary namespace associated with the earlier state of the HDFS namespace. Utilizing the identified PPI of the secondary namespace, the disclosed technology generates an earlier state namespace of the HDFS using the metadata information captured within the particular PPI. In some embodiments, the earlier state namespace of the HDFS is further converted into an appropriate format (i.e. FSImage file 225) usable by the HDFS.

As discussed above, the NameNode 205 maintains the HDFS namespace 215 as FSImage file 225, where the file 225 represents a persistent checkpoint of the HDFS metadata. The FSImage file 225 contains a serialized form of all the directory and file inodes in the file system. Each inode is an internal representation of a file or directory's metadata and contains such information as the file's replication level, modification and access times, access permissions, block size, and the blocks the file is made up of. Further, for directories, the modification time, permissions, and quota metadata are stored in the inode.

In some embodiments, the disclosed technology utilizes the FSImage file 225 to determine the hierarchy of files and directories in the HDFS namespace 215. The disclosed technology utilizes the determined hierarchy and the relationship between the various files and directories to recreate the hierarchy in the secondary namespace in the NFS 220. Further, utilizing the FSImage file 225, the disclosed technology gathers the metadata associated with each of the files and directories in the HDFS namespace 215.

The disclosed technology stores the gathered metadata in association with the files and directories created in the secondary namespace in the NFS 220. For instance, the disclosed technology gathers a selected file's metadata information, e.g., block ids of blocks associated with the selected file, file's replication level, modification and access times, access permissions, block size, etc. The gathered metadata can be stored as a metadata file in association with the selected file.

In some embodiments, the gathered metadata of the selected file is stored as the content of the selected file. Such files with metadata as its content can be stored as a file with a predetermined filename extension, e.g., ".meta", in NFS 220. Similarly, the metadata associated with a directory can be stored as a file in the NFS 220 under the directory associated with the metadata.

As discussed earlier, the data associated with the files in HDFS are stored as data blocks in the cluster of DataNodes 210a-210n while the FSImage file 225 maintains the block ids of data blocks associated with the stored files. The FSImage file 225, however, does not record the DataNodes 210a-210n on which the blocks are stored. Instead the NameNode 205 keeps this mapping as a BlockMap file in memory, which it constructs by asking the DataNodes 210a-210n for their block lists when they join the cluster and periodically updates the BlockMap to ensure the NameNode's 205 block mapping is up-to-date.

As data blocks are added and deleted from the DataNodes 210a-210n, the BlockMap that maps DataNodes 210a-210n to data blocks constantly changes over time. So, when a PPI is created, the BlockMap representing the mapping between the DataNodes 210a-210n and the data blocks at that point in time needs to be captured. In some embodiments, the disclosed technology stores the BlockMap as a file within the NFS 220. Any PPI of the secondary namespace and the associated files and data managed by the NFS creates a PPI of the BlockMap file.

As discussed earlier, the NameNode 205 does not update HDFS namespace 215 (i.e. the FSImage file 225) every time a write request is received. Instead, the NameNode 205 logs the transactions in the EditLog 230 and updates the HDFS namespace using the EditLog 230 during the next checkpoint creation. In some embodiments, the disclosed technology does not update the secondary namespace in NFS 220 every time a write request is received.

In some embodiments, the disclosed technology creates an initial secondary namespace in NFS 220 utilizing the FSImage file 225 stored in the NFS 220. In some embodiments, the disclosed technology updates the initial secondary namespace in NFS 220 when a checkpoint creation process is initiated to create the latest FSImage file 225 (by applying the logged transactions in the EditLog 230). In some embodiments, the disclosed technology updates the initial secondary namespace in NFS 220 utilizing the transactions logged in the EditLog 230.

Such an updated secondary namespace in NFS 220 will continue to be a copy of the HDFS namespace 215 (as maintained in the persistent FSImage file 225) and its hierarchy of files and directories. For example, the EditLog 230 describes a transaction creating a new file under an existing directory and provides the various metadata associated with the new file and the existing directory. Utilizing the details in the EditLog 230, the disclosed technology will create the new file under the existing directory in the secondary namespace in NFS 220 and store the metadata in association with the new file and the existing directory, accordingly.

In some embodiments, when the NameNode 205 receives a request to create a PPI of the system 200, the disclosed technology initiates a persistent checkpoint creation of the FSImage file 225 using the earlier disclosed technique 400. In some embodiments, when the PPI request is received, the disclosed technology utilizes the EditLog 230 to update the secondary namespace in NFS 220, creating a copy of the HDFS namespace 215 as reflected in the in-memory copy of the HDFS namespace 215.

In some embodiments, when the PPI request is received, the disclosed technology stores a copy of the BlockMap as maintained in the memory of the NameNode 205 at the initiation of the checkpoint process. The copy is stored within the secondary namespace of the NFS 220. In some embodiments, when the PPI request is received, the disclosed technology updates the secondary namespace and stores an associated copy of the BlockMap in the secondary namespace before initiating the creation of the PPI of the secondary namespace using the PPI features of the NFS 220.

Turning to the HDFS data stored in the cluster of DataNodes 210a-210n, the DataNodes 210a-210n store the HDFS data as files in their respective local host system's Native File System 240a-240n (also referred to as local file system). The DataNodes 210a-210n have no knowledge about HDFS files or their metadata. For instance, the DataNode 210a stores each block of HDFS data in a separate file in its respective local file system. In some embodiments, the disclosed technology creates a PPI of the HDFS namespace 215 (i.e. the HDFS metadata) using the secondary namespace hosted by the NFS 220.

In some embodiments, the disclosed technology does not request the DataNodes 210a-210n to create a PPI of the data blocks. In some embodiments, the disclosed technology utilizes the PPIs of the BlockMap to determine whether a given data block stored with the DataNodes 210a-210n is associated with a PPI of the HDFS namespace 215. As discussed earlier, the BlockMap PPI contains the mapping of the DataNodes 210a-210n to the various data blocks associated with the files in a HDFS namespace PPI 215.

When a request to delete a data block is received by the NameNode 205, the disclosed technology utilizes the PPIs of the BlockMap to determines whether the data blocks to be deleted are associated with any of the BlockMap. When a positive match is found, the disclosed technology prevents the data block from being deleted from the DataNodes 210a-210n as the data block continues to serve as a point-in-time copy of the data associated with a file at an earlier time.

In some embodiments, when a positive match is found, the disclosed technology blocks the delete request from being issued to the DataNodes 210a-210n but provides the NameNode 205 with a confirmation of the deletion of the data blocks. This causes the NameNode 205 to function with the assumption that those data blocks have been deleted. The disclosed technology, thus, allows the creation of the PPIs of the distributed processing system 200 by PPIing the namespace/metadata of the distributed file system using the PPI feature of a local/secondary file system of a local server hosting the distributed file system. Such a PPIing of the distributed processing system 200 does not require any additional PPIing of the data stored in the cluster of storage nodes.

Figure 5:
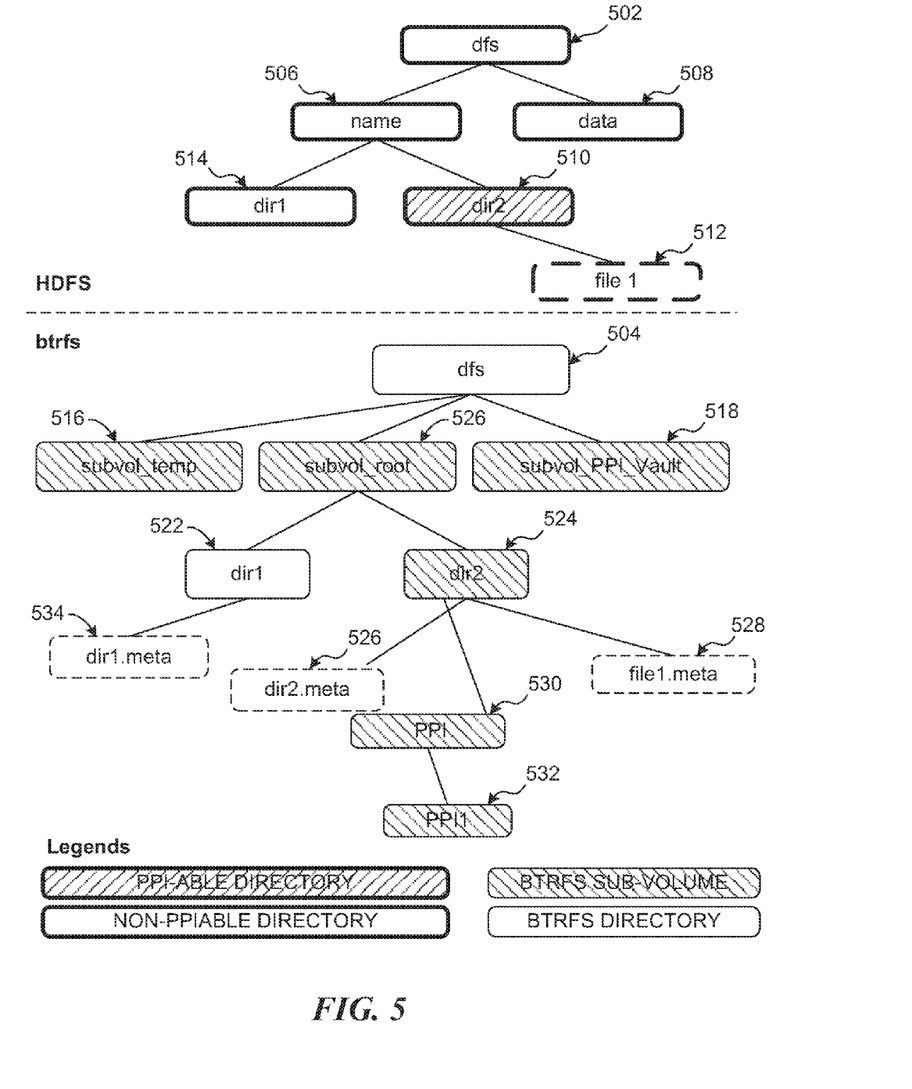
FIG. 5 is a block diagram illustrating the creation of a secondary namespace in B-tree File System ("Btrfs") of a local host system based on the namespace of HDFS.

Turning now to FIG. 5, FIG. 5 is a block diagram 500 illustrating the creation of a secondary namespace 504 in B-tree File System ("Btrfs") of a local host system based on the namespace 502 of HDFS. The Btrfs file system includes PPIing features that allow creation of PPIs of the secondary namespace 504 in Btrfs. The HDFS namespace 502 includes root directories name 506, data 508, while the root directory name 506 contains directories dir1 514 and dir2 510. Further, dir2 510 contains a file file1 512. Also, in HDFS namespace 502, only directory dir2 510 is designated for PPI creation while directory dir2 is blocked from being PPIed.

Utilizing the disclosed technology, a secondary namespace 504 with a hierarchy of files and directories is created in Btrfs using the corresponding hierarchy of files and directories in the HDFS namespace 502. In Btrfs, the disclosed technology creates a root subvolume 520 under the Btrfs file system root to associate the root directory name 506 with the root subvolume 520. Further, the directories dir1 522 and dir2 524 are created under the subvolume 520 (associated with the root directory name 506).

As discussed earlier, the disclosed technology creates metadata files dir1.meta 534 and dir2.meta 526, associated with directories dir1 522 and dir2 524, which include the metadata associated with them in the HDFS namespace 502. The disclosed technology further creates a metadata file file1.meta 528 under directory dir2 524, which contains the metadata associated with file1 in the HDFS namespace 502. In addition, the disclosed technology utilizes the PPI feature of Btrfs to create a PPI of directory dir2 524 and its content.

In Btrfs, a directory 530 is created to contain the PPI of the directory being PPIed (i.e., dir2 524) and located under the directory being PPIed. The directory 530 containing the PPI further includes directories for each of the PPIs, e.g. snap1 532, of the directory dir2 524 created over time. In various embodiments, the disclosed technology utilizes the PPI information contained in the PPI directories 532 to create a PPI of the HDFS namespace (i.e. create a PPI of FSImage file) and restore the HDFS namespace to the earlier state when required.

In some embodiments, the disclosed technology utilizes the PPI information contained in the PPI directories 532 to provide information regarding the various PPIs. In some embodiments, the disclosed technology allows the HDFS namespace to be created and restored from any of the available PPIs, allowing the HDFS namespace to be rollbacked accordingly. In some embodiments, the disclosed technology provides the information regarding the various PPIs at a directory level in the HDFS namespace, where a PPI of a given directory and its contents are provided as a subfolder under the given directory.

For example, when a PPI #1 of dir #1 (in a HDFS namespace) was created, the dir #1 contained files A and B. When a PPI #2 of dir #1 was created, the dir #1 contained files A, B and C. When a PPI #3 of dir #1 was created, the dir #1 contained files A, C and D. The dir #1 currently contains files A, C, D and E. In such a HDFS namespace, the contents of the dir #1 not only includes files A, C, D and E, but also the PPIs as subfolders ".PPI #1", ".PPI #2" and ".PPI #3". Further, each of the PPI subfolder provides information regarding the contents of dir #1 when the respective PPI was created. For example, the contents of subfolder ".PPI #1" includes files A and B. Such information regarding the various PPIs at a directory level can be utilized to selectively restore the HDFS namespace at a directory/file level.

In some embodiments, the disclosed technology utilizes the PPI information contained in the PPI directories 532 to compare and provide a difference between any two given PPIs. Such information could be very helpful when trying to determine the changes that have happened to a given HDFS namespace in the timeframe between the creation of any two given PPIs. The information could be utilized to determine which PPI to be utilized when rolling back the HDFS namespace.

In some embodiments, the disclosed technology compares the metadata information of the files and directories of any two given PPIs to determine the changes to the HDFS namespace in the timeframe between the creation of the two given PPIs. In some embodiments, the disclosed technology creates a HDFS namespace for each of the two given PPIs being compared and traverses through the files and directories of the two HDFS namespace to determine the changes to the HDFS namespace. For example, in the above described HDFS namespace with PPIs #1, #2 and #3 of dir #1, a comparison of PPIs #2 and #3 of dir #1 using the disclosed technology would list file B as being deleted in PPI #3 and file D as being added in PPI #3.

Figure 6:
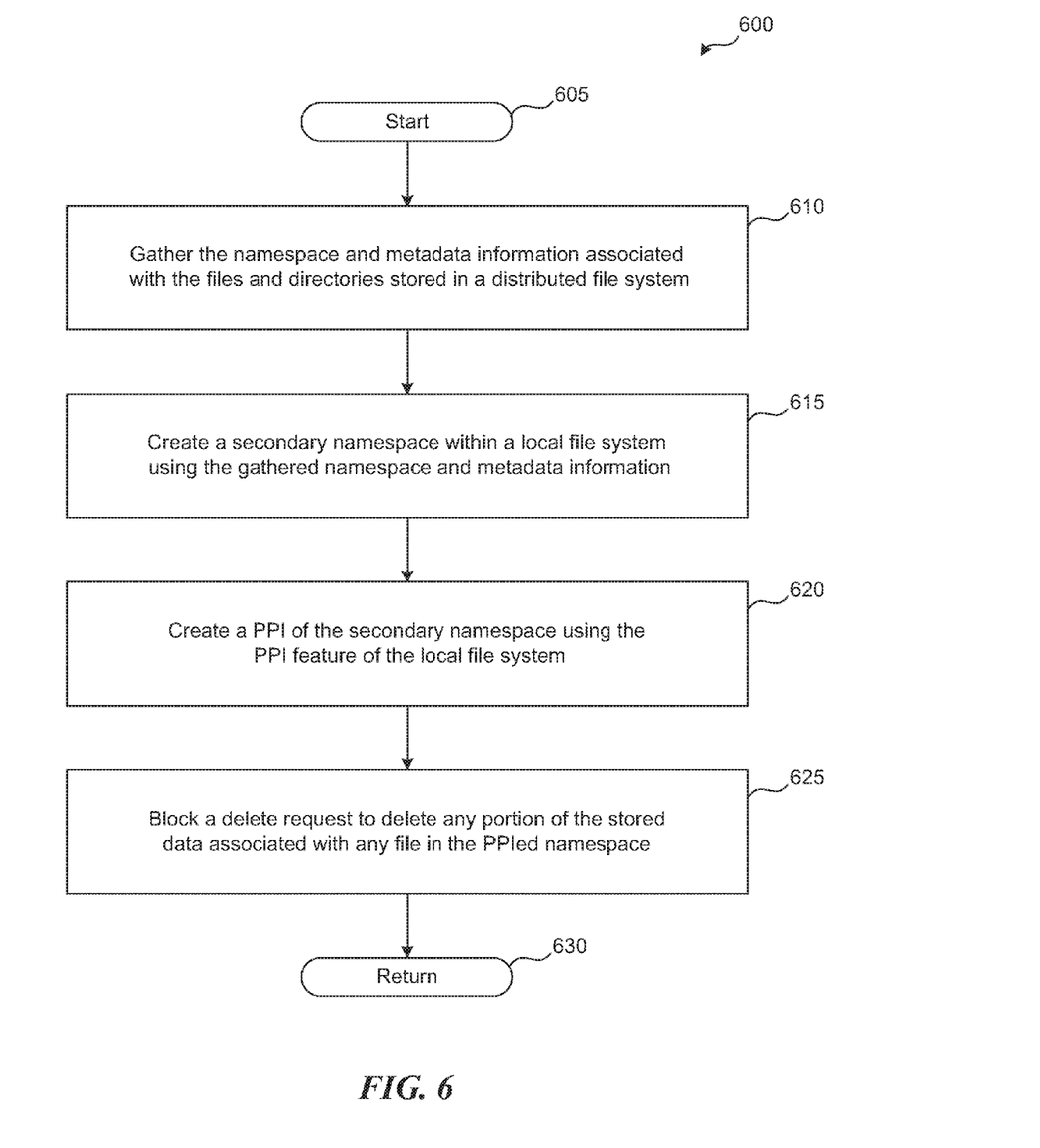
FIG. 6 is a flow diagram illustrating a method for creating a PPI of data managed by a distributed file system, consistent with various embodiments.

FIG. 6 is a flow diagram illustrating a method 600 for creating a PPI of data managed by a distributed file system, consistent with various embodiments. In various embodiments, the method 600 may be executed in a distributed processing environment, e.g., distributed processing environment 200 of FIG. 2. The method 600 starts at block 605. At block 610, a master node of the distributed processing environment gathers a distributed file system's namespace and the metadata information, associated with the stored data, stored in conjunction with the namespace.

At block 615, the master node creates a secondary namespace within a local file system of a local host system acting as the master node. In some embodiments, the master node creates a secondary namespace within a local file system of a local host system whether or not the local host system is acting as a master node. The master node creates the secondary namespace utilizing the gathered namespace and metadata information, where the hierarchy of the files and directories in the secondary namespace is a copy of the gathered namespace.

In some embodiments, the master node stores the gathered metadata within the secondary namespace. In some embodiments, the gathered metadata is stored as files within the associated directories and as content of the files they are associated with. In block 620, a PPI of the secondary namespace is created using a PPI feature of the local file system. In some embodiments, the master node initiates the PPI creation of the secondary namespace by sending a request for PPI creation to the local file system.

In some embodiments, the master node initiates the PPI creation of the secondary namespace whenever the master node receives a request to create a PPI of the distributed file system and the associated data. In block 625, the master node blocks any request to delete data blocks associated with a file included in any of the PPIs. In some embodiments, the master node maintains a summary of data blocks stored in the various slave nodes at the time of the creation of a given PPI.

In some embodiments, the master node utilizes the summaries associated with various PPIs to determine whether a data block can be deleted without affecting any PPIs that include files the data block is part of. In some embodiments, when a positive match is found between the summaries and the data block to be deleted, the master node blocks the delete request from being issued to the slave nodes. The method returns at block 655.

Those skilled in the art will appreciate that the logic illustrated in FIG. 6 and described above, and in each of the flow diagrams discussed below, may be altered in various ways. For example, the order of the logic may be rearranged, substeps may be performed in parallel, illustrated logic may be omitted, other logic may be included, etc.

Figure 7:
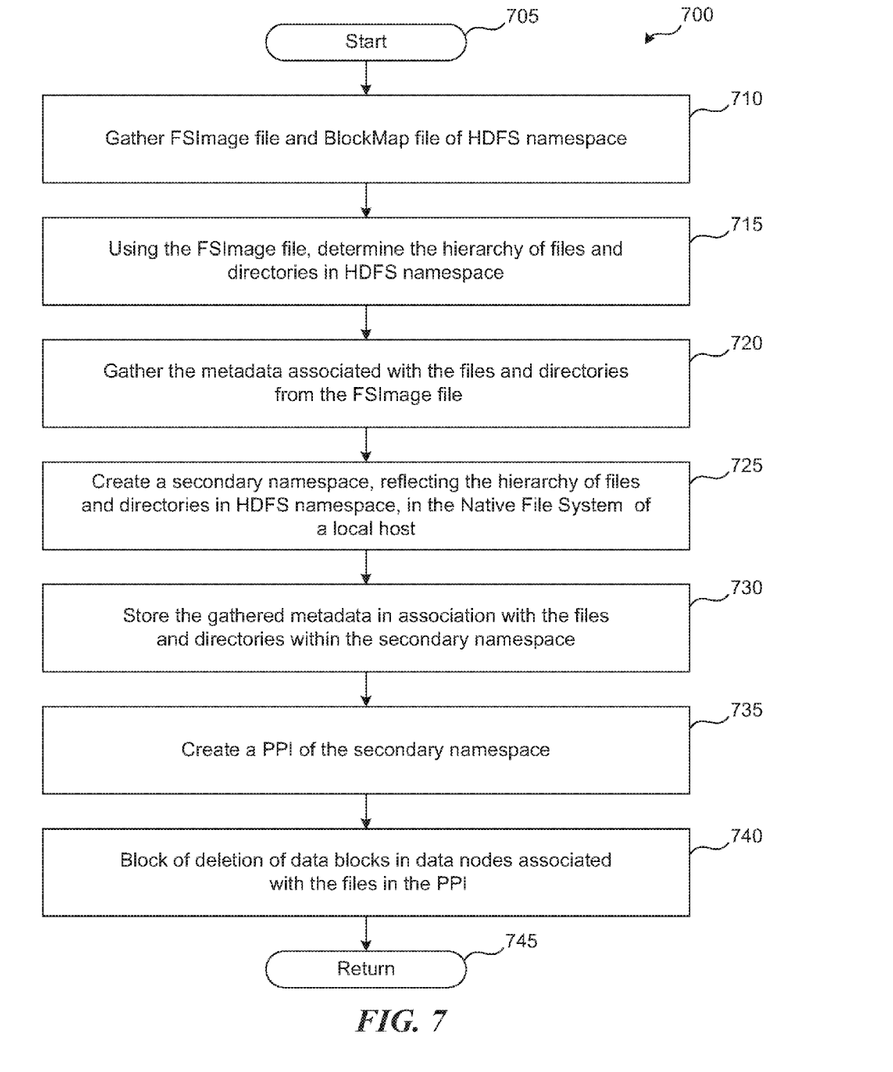
FIG. 7 is a flow diagram illustrating a method for creating a PPI of data managed by HDFS, consistent with various embodiments.

FIG. 7 is a flow diagram illustrating a method 700 for creating a PPI of data managed by HDFS, consistent with various embodiments. In various embodiments, the method 700 may be executed in a Hadoop distributed processing environment, e.g., distributed processing environment 200 of FIG. 2. The method 700 starts at block 705. At block 710, the NameNode 205 gathers the FSImage file and BlockMap file of HDFS namespace 215.

At block 715, the NameNode 205 determines the hierarchy of files and directories in HDFS namespace using the FSImage file 225. At block 720, the NameNode 205 gathers the metadata associated with the files and directories from the FSImage file. At block 725, the NameNode 205 creates a secondary namespace, reflecting the hierarchy of files and directories in HDFS namespace, in the NFS 220 of a local host.

At block 730, the NameNode 205 stores the gathered metadata in association with the files and directories within the secondary namespace. At block 735, the NameNode 205 requests the NFS 220 to create a PPI of the secondary namespace, where the secondary namespace PPI serves as the PPI of the HDFS namespace 215 (i.e. HDFS metadata). At block 740, the NameNode 205 blocks any request to delete data blocks stored in the data nodes when the data blocks are associated with any of the files included in the PPI of the secondary namespace. The method returns at block 745.

Figure 8:
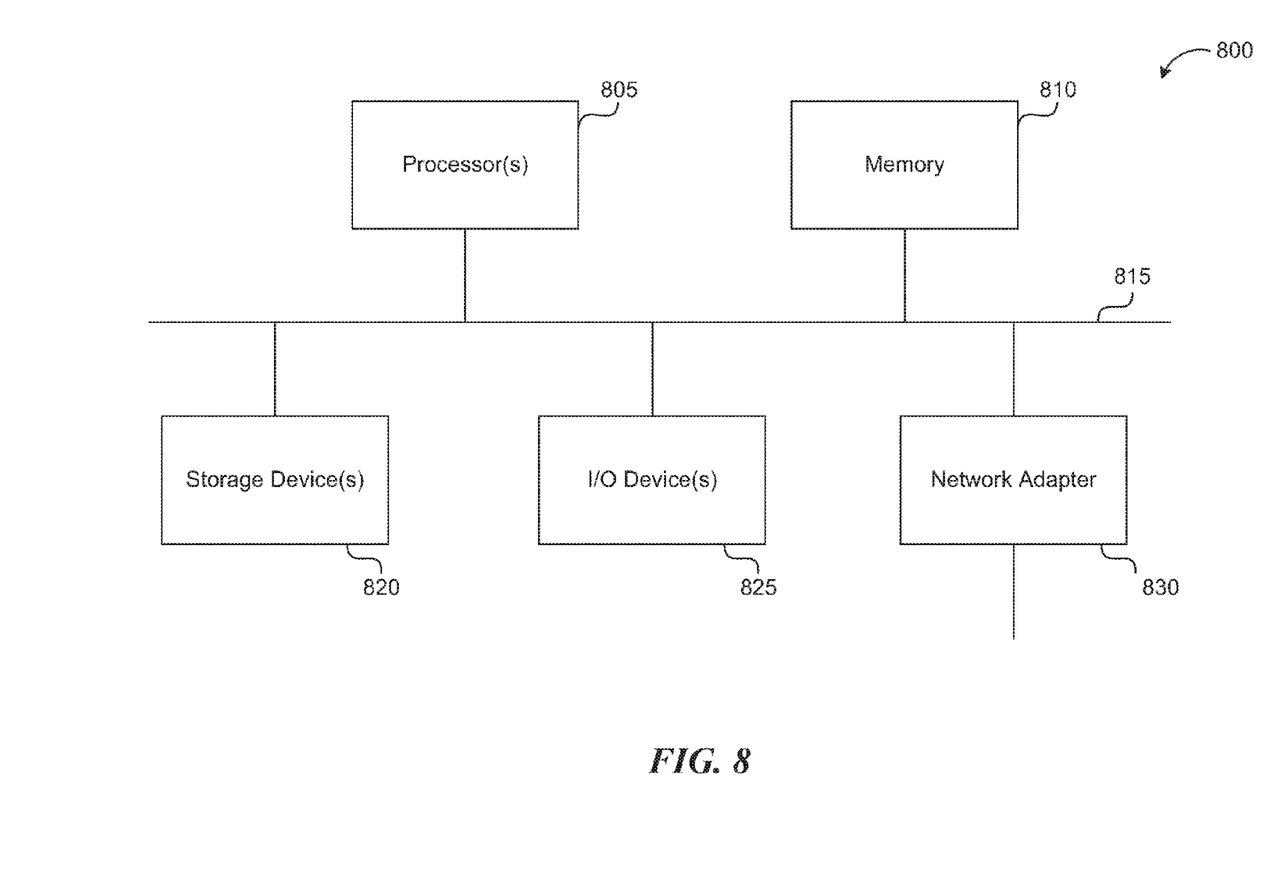
FIG. 8 is a block diagram of a computer system as may be used to implement features of some embodiments of the disclosed technology.

FIG. 8 is a block diagram of a computer system as may be used to implement features of some embodiments of the disclosed technology. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the technology. Accordingly, the technology is not limited except as defined by the appended claims.

What is claimed is:

1. A computer implemented method, comprising:
   receiving metadata information associated with data stored within a distributed file system having, a namespace, the namespace maintaining a hierarchy of files and directories associated with the stored data;
   creating a secondary namespace within a local file system using the metadata information, a hierarchy of files and directories in the secondary namespace corresponding to the hierarchy of files and directories in the namespace of the distributed file system; and
   creating an image of the secondary namespace when a request to create an image of the distributed file system is received, the image of the secondary namespace created using an image creation feature of the local file system.

2. The method of claim 1, further comprising:
   blocking a request to delete any portion of the stored data associated with a file included
   in the image of the secondary namespace.

3. The method of claim 1, further comprising:
   receiving a request to store an additional data within the distributed file system;
   storing an additional metadata information generated from processing the received request in a data log, the additional metadata information including any changes to the hierarchy of files and directories in the namespace of the distributed file system; and
   modifying the secondary namespace using the additional metadata information stored within the data log, the modification including any change to the hierarchy of files and directories in the secondary namespace, the modification including storing a portion of the additional metadata information using the secondary namespace.

4. The method of claim 1, further comprising:
receiving a request to revert the distributed file system and the data stored within to an earlier state;
identifying a particular image of the secondary namespace associated with the earlier state of the distributed file system; and
generating an earlier state namespace of the distributed file system using the metadata information captured within the particular image.

5. The method of claim 1, wherein the distributed file system is a Hadoop Distributed File System ("HDFS"), wherein the local file system is a Network File System with a PPI creation feature.

6. The method of claim 1, wherein the local file system is a B-tree File System ("Btrfs"), the Btrfs including a PPI creation feature.

7. A system comprising at least one server, the at least server configured to:
receive a block map file and a namespace file associated with a namespace of the system, the block map file including a mapping between a data block associated with a selected file stored using the system and a location of the data block associated with the selected file, the namespace file including information relating to a hierarchy of files and directories in the namespace of the system;
determine the hierarchy of files and directories in the namespace of the system using the namespace file;
gather a metadata information associated with the files and the directories using the namespace file and the block map file;
create a secondary namespace within a local file system of a local host, a hierarchy of files and directories in the secondary namespace corresponding to the hierarchy of files and directories in the namespace of the system; and
create a an image of the secondary namespace when a request to create an image of the system is received, the image of the secondary namespace created using an image creation feature of the local file system.

8. The system of claim 7, wherein the at least server is further configured to block a request to delete any portion of the stored data associated with a file included in the image of the secondary namespace.

9. The system of claim 7, wherein the at least server is further configured to:
receive a request to store an additional data within the distributed file system;
store an additional metadata information generated from processing the received request in a data log, the additional metadata information including any changes to the hierarchy of files and directories in the namespace of the distributed file system; and
modify the secondary namespace using the additional metadata information stored within the data log, the modification including any change to the hierarchy of files and directories in the secondary namespace, the modification including storing a portion of the additional metadata information using the secondary namespace.

10. The system of claim 7, wherein the at least server is further configured to:
receive a request to revert the distributed file system and the data stored within to an earlier state;
identify a particular image of the secondary namespace associated with the earlier state of the distributed file system; and
generate an earlier state namespace of the distributed file system using the metadata information captured within the particular image.

11. The system of claim 7, wherein the local file system is a Network File System with an image creation feature.

12. The system of claim 7, wherein the local file system is a B-tree File System ("Btrfs"), the Btrfs including an image creation feature.

13. A non-transitory computer readable storage medium storing computer executable instructions, comprising:
instructions for receiving metadata information associated with a data stored within a distributed file system, the namespace maintaining a hierarchy of files and directories associated with the stored data;
instructions for creating a secondary namespace within a local file system using the metadata information, a hierarchy of files and directories in the secondary namespace corresponding to the hierarchy of files and directories in the namespace of the distributed file system; and
instructions for creating an image of the secondary namespace when a request to create an image of the distributed file system is received, the image of the secondary namespace created using an image creation feature of the local file system.

14. The computer readable storage medium of claim 13, further comprising:
instructions for blocking a request to delete any portion of the stored data associated with a file included in the image of the secondary namespace.

15. The computer readable storage medium of claim 13, further comprising: instructions for receiving a request to store an additional data within the distributed file system;
instructions for storing an additional metadata information generated from processing the received request in a data log, the additional metadata information including any changes to the hierarchy of files and directories in the namespace of the distributed file system; and
instructions for modifying the secondary namespace using the additional metadata information stored within the data log, the modification including any change to the hierarchy of files and directories in the secondary namespace, the modification including storing a portion of the additional metadata information using the secondary namespace.

16. The computer readable storage medium of claim 13, further comprising:
instructions for receiving a request to revert the distributed file system and the data stored within to an earlier state;
instructions for identifying a particular image of the secondary namespace associated with the earlier state of the distributed file system; and
instructions for generating an earlier state namespace of the distributed file system using the metadata information captured within the particular image.

17. The computer readable storage medium of claim 13, wherein the distributed file system is a Hadoop Distributed File System ("HDFS"), wherein the local file system is a Network File System with an image creation feature.

18. The computer readable storage medium of claim 13, wherein the local file system is a B-tree File System ("Btrfs"), the Btrfs including an image creation feature.

19. The method of claim 1, wherein the metadata information is stored within the namespace of the distributed file system, and the gathered metadata information is stored within the secondary namespace.

20. The computer readable storage medium of claim 13, wherein the metadata information is stored within the namespace of the distributed file system, and the gathered metadata information is stored within the secondary namespace.

* * * * *